United States Patent [19]

Rogers

[11] Patent Number: 4,643,447
[45] Date of Patent: Feb. 17, 1987

[54] SUSPENSION SYSTEM FOR A TRUCK OR THE LIKE

[76] Inventor: Ralph R. Rogers, 733 W. 21st, So. Sioux City, Nebr. 68776

[21] Appl. No.: 819,732

[22] Filed: Jan. 21, 1986

[51] Int. Cl.⁴ .............................................. B60G 11/26
[52] U.S. Cl. ...................................... 280/712; 267/18; 267/31; 280/718
[58] Field of Search .................. 280/712, 718; 267/18, 267/31, 32, 54 R, 56

[56] References Cited

U.S. PATENT DOCUMENTS

| | | | |
|---|---|---|---|
| 1,188,821 | 6/1916 | Peck | 267/56 |
| 1,200,194 | 10/1916 | Houdaille | 267/56 |
| 2,054,305 | 9/1936 | Stilwell | 267/54 R |
| 2,364,842 | 12/1944 | Feigelson | 267/56 |
| 2,445,295 | 7/1948 | Pond | 267/56 |
| 2,861,797 | 11/1958 | Norrie | 267/56 |
| 3,063,732 | 11/1962 | Harbers et al. | 280/712 |
| 3,233,915 | 2/1966 | Hamlet | 280/712 |
| 3,309,107 | 3/1967 | Chieger | 280/712 |
| 3,785,673 | 1/1974 | Harbers, Jr. et al. | 280/712 |
| 3,970,293 | 7/1976 | Sweet et al. | 280/712 |
| 4,580,798 | 4/1986 | Roelofs | 280/712 |

Primary Examiner—John J. Love
Assistant Examiner—Kenneth R. Rice
Attorney, Agent, or Firm—Zarley, McKee, Thomte, Voorhees & Sease

[57] ABSTRACT

A suspension system is described which interconnects each of the longitudinally extending frame members of a truck or the like to a transversely extending axle housing positioned therebelow. Each of the suspension systems comprises a leaf spring assembly connected to the associated frame member forwardly of the axle housing. The leaf spring assembly is connected, intermediate its ends, to the axle housing. A box-like support is positioned at the rearward end of each of the leaf spring assemblies and has its forward end receiving the rearward end of the associated leaf spring assembly. The rearward end of the support has the lower end of an air spring mounted thereon. The upper end of the air spring engages a plate which extends laterally from a bracket secured to the associated frame member. The rearward end of the leaf spring assembly is pivotally secured to the upper intermediate portion of the support forwardly of the air spring. The air spring yieldably resists the upward movement of the axle housing and the rearward end of the leaf spring assembly towards the frame member and yieldably resists the downwardly movement of the frame member towards the axle housing.

1 Claim, 3 Drawing Figures

SUSPENSION SYSTEM FOR A TRUCK OR THE LIKE

BACKGROUND OF THE INVENTION

This invention relates to an improved suspension system and more particularly to an improved air suspension system for a truck or the like.

Conventional single axle trucks normally have a transversely extending axle which is positioned beneath longitudinally extending frame members. Ordinarily, a leaf spring assembly connects each of the frame members to the axle. The conventional suspension system just described results in a less than smooth ride. Further, the conventional suspension system does not normally have the ability to compensate for very heavy loads. Some attempts have been made to provide air suspension systems for trucks to overcome the disadvantages of the conventional systems, but the same are extremely expensive and normally may not be installed on the truck after the truck has been manufactured.

Therefore, it is a principal object of the invention to provide an improved suspension system for a truck or the like.

A further object of the invention is to provide a suspension system for a truck or the like which may be mounted on a truck suspension system after the truck has been manufactured.

A further object of the invention is to provide a suspension system which may be easily installed on the existing truck suspension system.

Yet another object of the invention is to provide a suspension system which greatly improves the riding characteristics of the truck or the like.

Still another object of the invention is to provide a suspension system for a truck or the like having the ability to compensate for large loads.

Still another object of the invention is to provide an improved suspension system for a truck or the like which is durable and safe.

These and other objects will be apparent to those skilled in the art.

SUMMARY OF THE INVENTION

Figure 1:
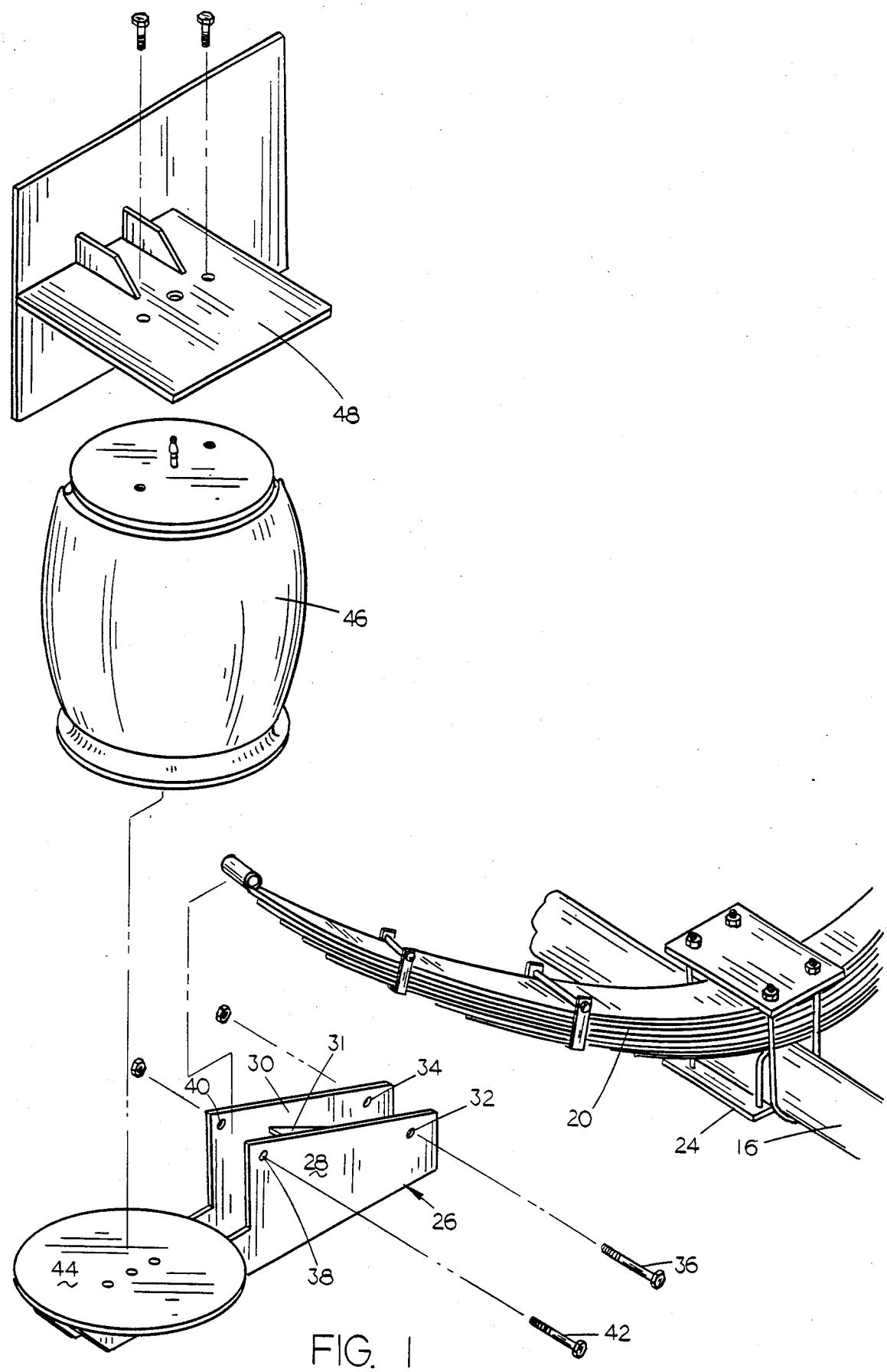
FIG. 1 is an exploded perspective view of the suspension system of this invention.

A suspension system interconnects each of the longitudinally extending frame members of a truck or the like with a transversely extending axle housing positioned therebelow. A leaf spring assembly is positioned adjacent each of the frame members and is conventionally connected at its forward end to the associated frame member and is conventionally connected to the axle housing by U-bolts or the like. A box-like support means is positioned at the rearward end of each of the leaf spring assemblies and has its forward end receiving the rearward end of the leaf spring assembly. The rearward end of the support means has the lower end of an air spring mounted thereon. The upper end of the air spring engages a plate which extends laterally from a bracket secured to the associated frame member. The rearward end of the leaf spring assembly is pivotally secured to the upper intermediate portion of the support means forwardly of the air spring. The air spring yieldably resists the upward movement of the axle housing and the rearward end of the leaf spring assembly towards the frame member and yieldably resists the downward movement of the frame member towards the axle housing.

DESCRIPTION OF THE PREFERRED EMBODIMENT

In the drawings, the numeral 10 refers to a conventional truck including a pair of longitudinally extending frame members 12 and 14 (not shown) having a transversely extending axle housing 16 positioned therebelow. Ground engaging wheels are secured to the ends of the axle positioned in the axle housing in conventional fashion. A suspension system 18 normally connects each of the frame members 12 and 14 to the axle housing 16. Each of the suspension systems 18 includes a leaf spring assembly 20 connected at its forward end to the associated frame member by means of a shackle 22. Leaf spring assembly 20 is connected, intermediate the length thereof, to axle housing 16 by U-bolt assembly 24. The rearward end of leaf spring assembly 20 would normally be connected to the associated frame member by means of a conventional shackle. It is this conventional structure which is modified to achieve the suspension system of this invention.

To modify the conventional suspension system, the rearward end of the leaf spring assembly 20 is disconnected from the shackle connecting it to the associated frame member. If the shackle poses an obstruction problem, the shackle may be removed from the frame member by a cutting torch or the like. In the suspension system of this invention, an elongated box-like support means 26 operatively interconnects the axle housing 16 and the rearward end of leaf spring assembly 20 to the associated frame member through an air spring as will now be described. Support means 26 includes spaced-apart sides 28 and 30 having an inclined plate 31 secured thereto and extending therebetween at the forward ends thereof as seen in the drawings. The upper forward ends of sides 28 and 30 are provided with openings 32 and 34 formed therein adapted to receive bolt 36 extending therethrough. As seen in the drawings, sides 28 and 30 are also provided with openings 38 and 40 intermediate the ends thereof adapted to receive bolt 42 therein. Air spring support or plate 44 is provided on the rearward end of the support means adapted to have the air spring 46 mounted thereon.

The upper end of the air spring 46 is operatively secured to the frame member 12 by means of a top plate 48 which is secured to and which extends laterally from bracket 50 secured to the frame member 12. The amount of air in the air springs may be selectively varied in conventional fashion. It is preferred that the support means 26 at each side of the truck be interconnected by means of a stabilizer bar (not shown) extending therebetween.

Figure 2:
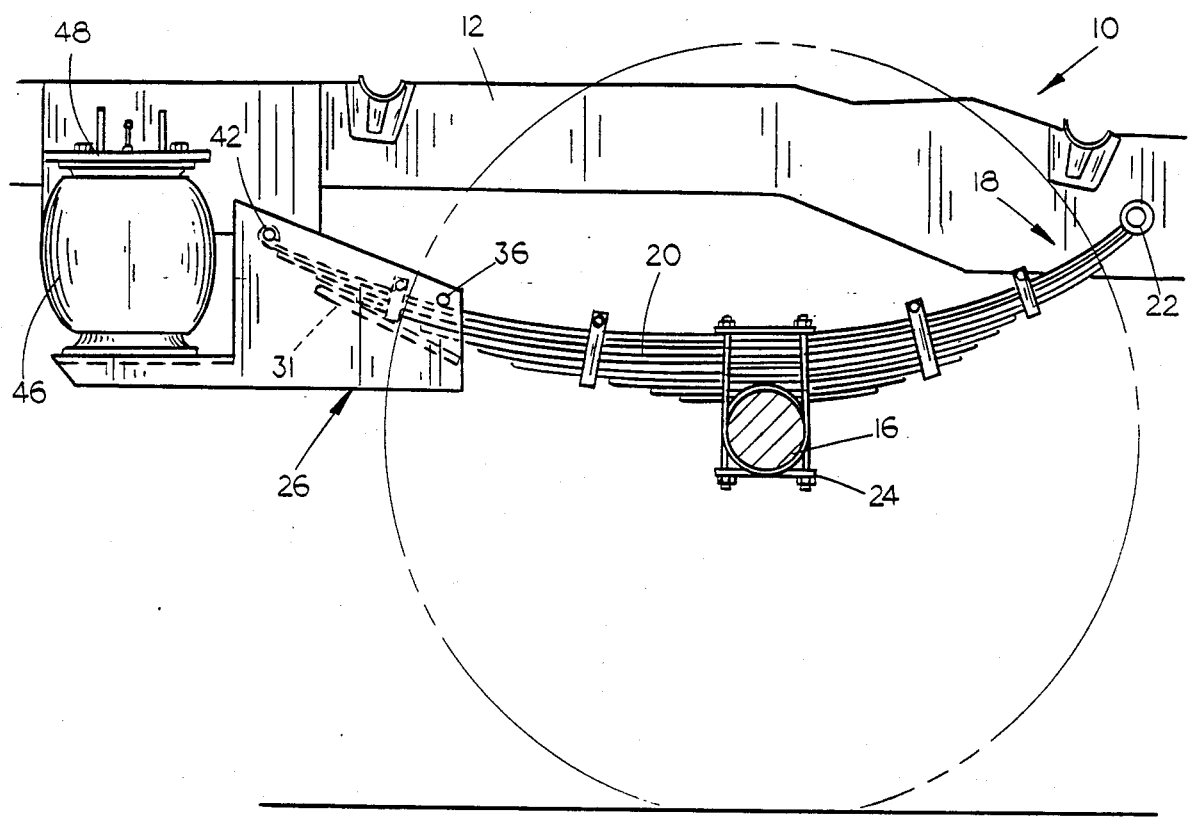
FIG. 2 is a side view of the suspension system.
Figure 3:
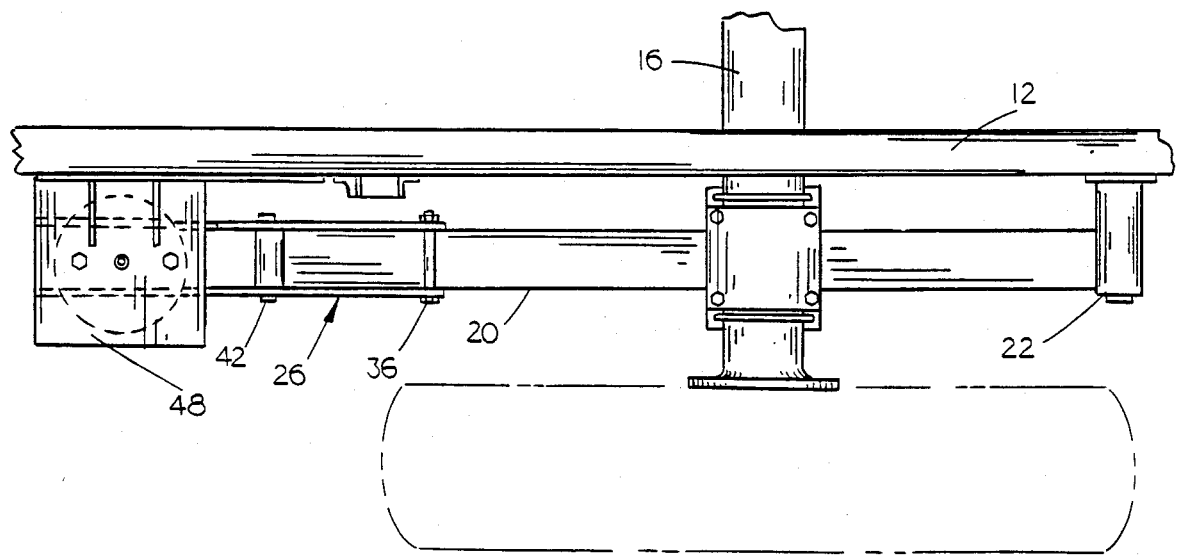
FIG. 3 is a top view of the suspension system.

As seen in the drawings, the support means is mounted on the associated spring assembly by positioning the rearward end of the spring assembly between the sides 28 and 30 with the rearward end of the spring assembly being positioned above the inclined plate 31 as best illustrated in FIG. 2. Bolt 42 is then extended through opening 38, through the rearward end of the spring assembly 20 and through the opening 40 to pivotally secure the rearward end of the spring assembly to the support means 26. Bolt 36 is then extended through openings 32 and 34 above spring assembly 20 to limit the pivotal movement of the support means relative to the spring assembly. The air spring 46 is then installed.

In use, the air springs are inflated to the desired pressure depending upon the load being carried by the truck. In use, bumps or the like on the road surface which are transmitted to the wheels of the truck causes the axle housing 16 to be moved upwardly towards the frame members of the truck. The rearward end of the associated leaf spring assembly may move slightly upwardly and downwardly through its pivotal connection with the support means 26. A small amount of pivotal movement is also permitted between the spring assembly and the support means 26. The air spring resists the upward movement of the rearward end of the support means 26. The fact that the support means 26 operatively interconnects the rearward end of the leaf spring assembly with the associated frame member through the air spring results in a much smoother "ride" being obtained than with the conventional leaf spring assembly. This is especially important when the truck is carrying passengers, horses, etc.

When heavy loads are carried by the truck, the air springs resist the downward movement of the frame members relative to the axle housing 16.

Thus it can be seen that a novel improved suspension system has been provided which may be used to convert leaf spring assemblies of the conventional type to an air suspension system without extensive modification. The improved suspension system of this invention may be installed on a truck or the like after the truck has been manufactured.

Thus it can be seen that the invention accomplishes at least all of its stated objectives.

I claim:

1. A suspension system for wheeled vehicles including a pair of spaced-apart longitudinally extending frame members having rearward and forward ends and a transversely extending axle housing positioned beneath the frame members forwardly of the rearward ends thereof, comprising,
   a leaf spring means having rearward and forward ends positioned outwardly of each of said frame members,
   each of said leaf spring means having its forward end secured to the associated frame member forwardly of said axle housing, said leaf spring means being rigidly secured, intermediate its ends, to said axle housing, the rearward end of said leaf spring means being positioned rearwardly of the associated axle housing,
   an elongated box-like support means including horizontally spaced-apart and vertically disposed side walls having upper and lower ends, a horizontally disposed support plate means at the rearward ends of said side walls,
   the rearward end of said leaf spring means being pivotally secured to said side walls adjacent the upper rearward ends thereof,
   a plate means secured to said side walls and extending therebetween below the upper ends thereof rearwardly of the forward ends thereof and below said leaf spring means,
   a bolt means extending between said side walls adjacent the forward ends thereof above said leaf spring means,
   said plate means and said bolt means restricting relative vertical movement between said leaf spring means and said support means,
   an upstanding air spring means having upper and lower ends, the lower end of said air spring means being mounted on said support plate means,
   and means rigidly connecting the upper end of said air spring means to said frame member whereby said air spring means yieldably resists the upward movement of said axle housing and the rearward end of said leaf spring means toward said frame member and yieldably resists the downward movement of said frame member towards said axle housing.

* * * * *